United States Patent
Hillstrom (10) Patent No.: US 7,266,358 B2
(45) Date of Patent: Sep. 4, 2007

(54) METHOD AND SYSTEM FOR NOISE REDUCTION IN MEASUREMENT RECEIVERS USING AUTOMATIC NOISE SUBTRACTION

(75) Inventor: Timothy L. Hillstrom, Liberty Lake, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 861 days.

(21) Appl. No.: 10/737,440

(22) Filed: Dec. 15, 2003

(65) Prior Publication Data

US 2005/0129152 A1    Jun. 16, 2005

(51) Int. Cl.
*H04L 1/00* (2006.01)
(52) U.S. Cl. .................. 455/296; 375/346
(58) Field of Classification Search .......... None
See application file for complete search history.

(56) References Cited

U.S. PATENT DOCUMENTS 6,122,309 A * 9/2000 Bergstrom et al. ........ 375/130
2007/0129042 A1 * 6/2007 Kristensson et al. ........ 455/296

* cited by examiner

*Primary Examiner*—Thanh Cong Le (57) ABSTRACT

An N-element noise model of a receiver is created, with the number of noise elements (N) determined by the equation N=(number of variable gain components+1). The components in the model are grouped into domains with each noise element associated with a domain. The domains are defined so that the noise contributions of the components within each domain are independent of the receiver gain state. A noise value is computed for each noise element. Each noise value is determined with reference to a particular point in the model, and is computed in a reference state. Input-referred noise values are calculated using each noise value and the current gain state data for the receiver. A composite input-referred noise value is computed using the input-referred noise values and subtracted from a measurement signal to reduce noise in the signal. The composite noise value can automatically be re-calculated for any receiver gain state.

16 Claims, 7 Drawing Sheets

METHOD AND SYSTEM FOR NOISE REDUCTION IN MEASUREMENT RECEIVERS USING AUTOMATIC NOISE SUBTRACTION

TECHNICAL FIELD

Embodiments in accordance with the invention relate generally to receivers, and more particularly to noise reduction in measurement receivers. Still more particularly, embodiments in accordance with the invention relate to methods and systems for noise reduction in measurement receivers using automatic noise subtraction.

BACKGROUND

Measurement receivers are used in a variety of applications, including spectrum analyzers, vector signal analyzers, and wireless test sets. Noise generated by the electrical components within the receivers limits the dynamic range of the measurements and alters the test results. Subtracting the noise from a measurement signal is therefore desirable in order to generate reliable results.

One technique for noise subtraction calculates the amount of noise present in a receiver when the receiver is in a particular state. For example, the noise may be determined when the receiver is in a maximum gain state. A sample of the instrument noise is measured when the device under test (DUT) is disconnected from the test equipment. The DUT is then connected to the test equipment and the noise subtracted from a measurement signal output by the DUT.

Typically the amount of noise measured in a particular state applies only to that state. This means the noise subtraction process must be repeated every time the receiver is set to a new state, such as, for example, a minimum gain state. The user must interrupt his or her test or measurement procedure and perform noise subtraction for each new receiver state.

SUMMARY

In accordance with the invention, a method and system for noise reduction in measurement receivers using automatic noise subtraction is provided. An N-element noise model of a receiver is created, with the number of noise elements (N) determined by the equation N=(number of variable gain components+1). The components in the noise model are then grouped into domains, with each noise element associated with a domain. The domains are defined so that the noise contributions of the components within each domain are independent of the receiver gain state. A noise value is then computed for each noise element. Each noise value is determined with reference to a particular point in the noise model, and is computed in a reference state. The reference state is the state at which the reference gain is measured during the gain calibration. Input-referred noise values are then calculated using each noise value and the current gain state data for the receiver. A composite input-referred noise value is computed using the input-referred noise values and subtracted from a measurement signal to reduce the noise in the signal. The composite input-referred noise value can automatically be re-calculated for any receiver gain state.

BRIEF DESCRIPTION OF THE DRAWINGS

The invention will best be understood by reference to the following detailed description of embodiments in accordance with the invention when read in conjunction with the accompanying drawings, wherein.

DETAILED DESCRIPTION

The invention relates to a method and system for noise reduction in measurement receivers using automatic noise subtraction. The following description is presented to enable one skilled in the art to make and use the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein.

Figure 1:
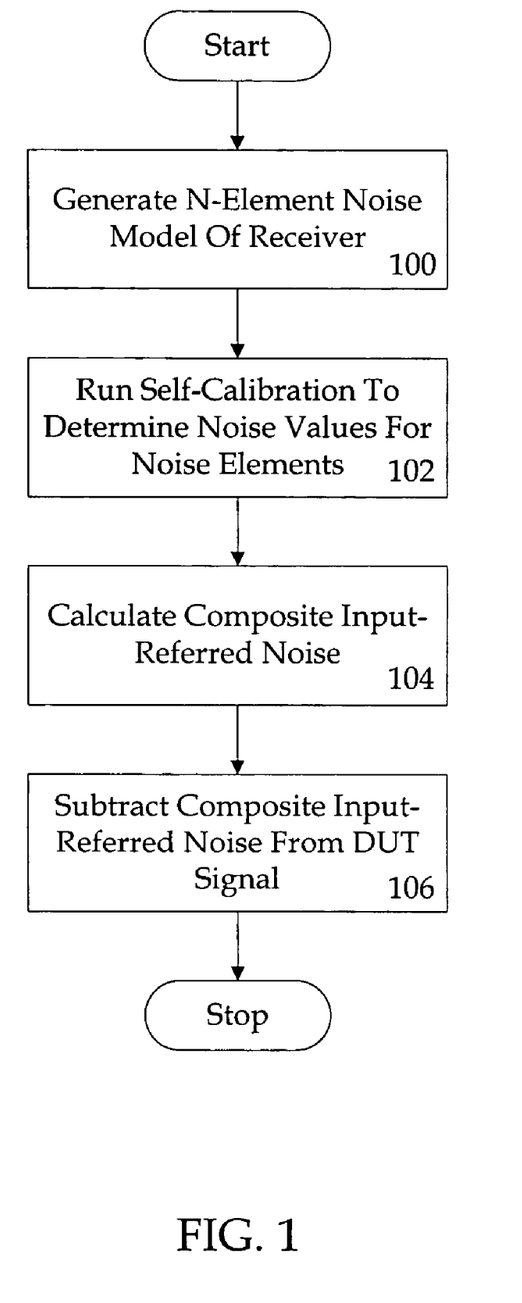
FIG. 1 is a flowchart of a method for noise subtraction in measurement receivers in an embodiment in accordance with the invention.

With reference now to the figures and in particular with reference to FIG. 1, there is shown a flowchart of a method for noise subtraction in measurement receivers in one embodiment in accordance with the invention. Noise subtraction in this embodiment operates on all possible receiver states including, but not limited to, RF frequency, IF frequency, and attenuator/gain states. Initially an N-element noise model of a receiver is generated, as shown in block 100. The N-element noise model is defined by the equation N=(number of variable gain components+1) in the FIG. 1 embodiment.

A noise value for each noise element in the noise model is then determined. This step is shown in block 102. In this embodiment, the noise values are determined by performing an offline self-calibration test for receiver gain and noise. A composite input-referred noise is then calculated and subtracted from a measurement signal output by a DUT (blocks 104 and 106). The noise values and the composite input-referred noise are calculated and subtracted using values defined in power density units in this embodiment in accordance with the invention. In other embodiments in accordance with the invention, the noise values and the composite input-referred noise may be calculated and subtracted using other units of measurement, including, but not limited to, amplitude and noise defined in a particular bandwidth.

Figure 2:
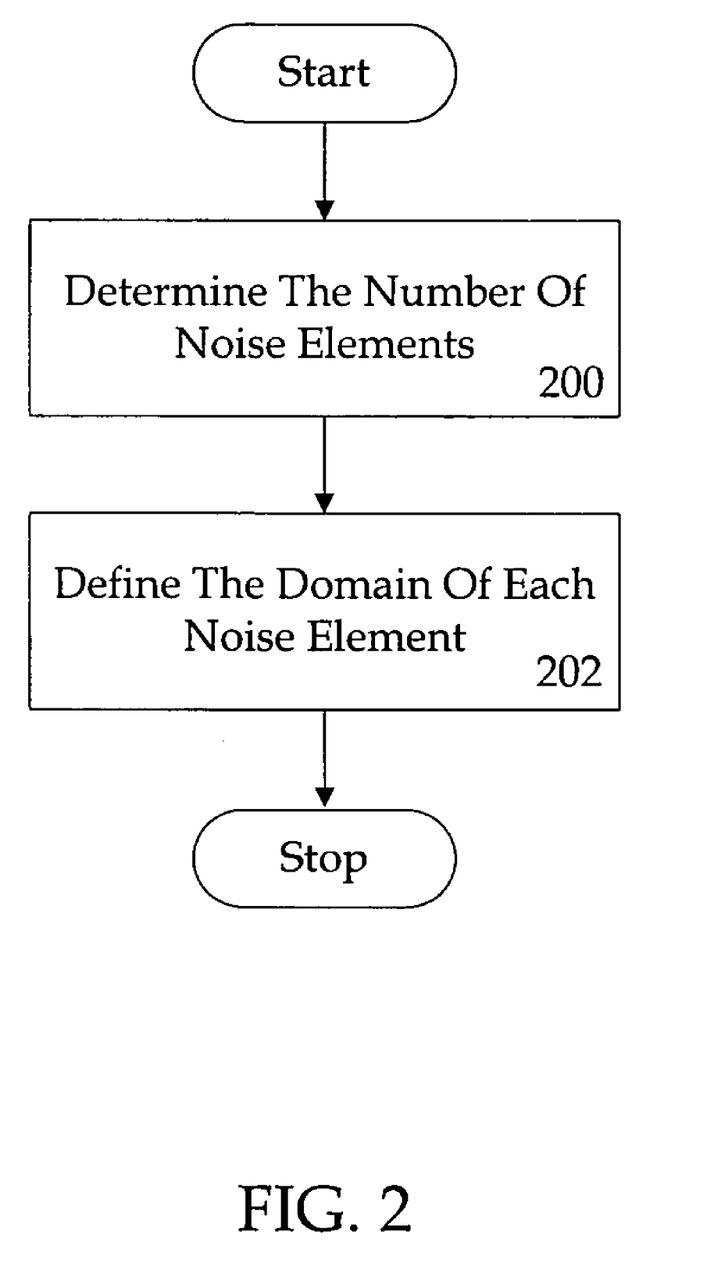
FIG. 2 is a flowchart of a method for generating an N-element noise model of a receiver in an embodiment in accordance with the invention.

FIG. 2 is a flowchart of a method for generating an N-element noise model of a receiver in an embodiment in accordance with the invention. This method corresponds to block 100 in FIG. 1. In the FIG. 2 embodiment, the N-element noise model is created during the design of a self-calibration algorithm. Initially the number of noise elements is determined, as shown in block 200. As stated earlier, the N-element noise model is defined by the equation N=(number of variable gain components+1). Thus, for example, a receiver that has four variable gain components would employ a five-element noise model.

The domain of each noise element is then defined at block 202. The domain of a noise element is the portion of the receiver components for which all noise contributions are attributed to that particular noise element. When attributed to a noise element, the noise contributions from the components within a domain are independent of receiver gain state.

Figure 3:
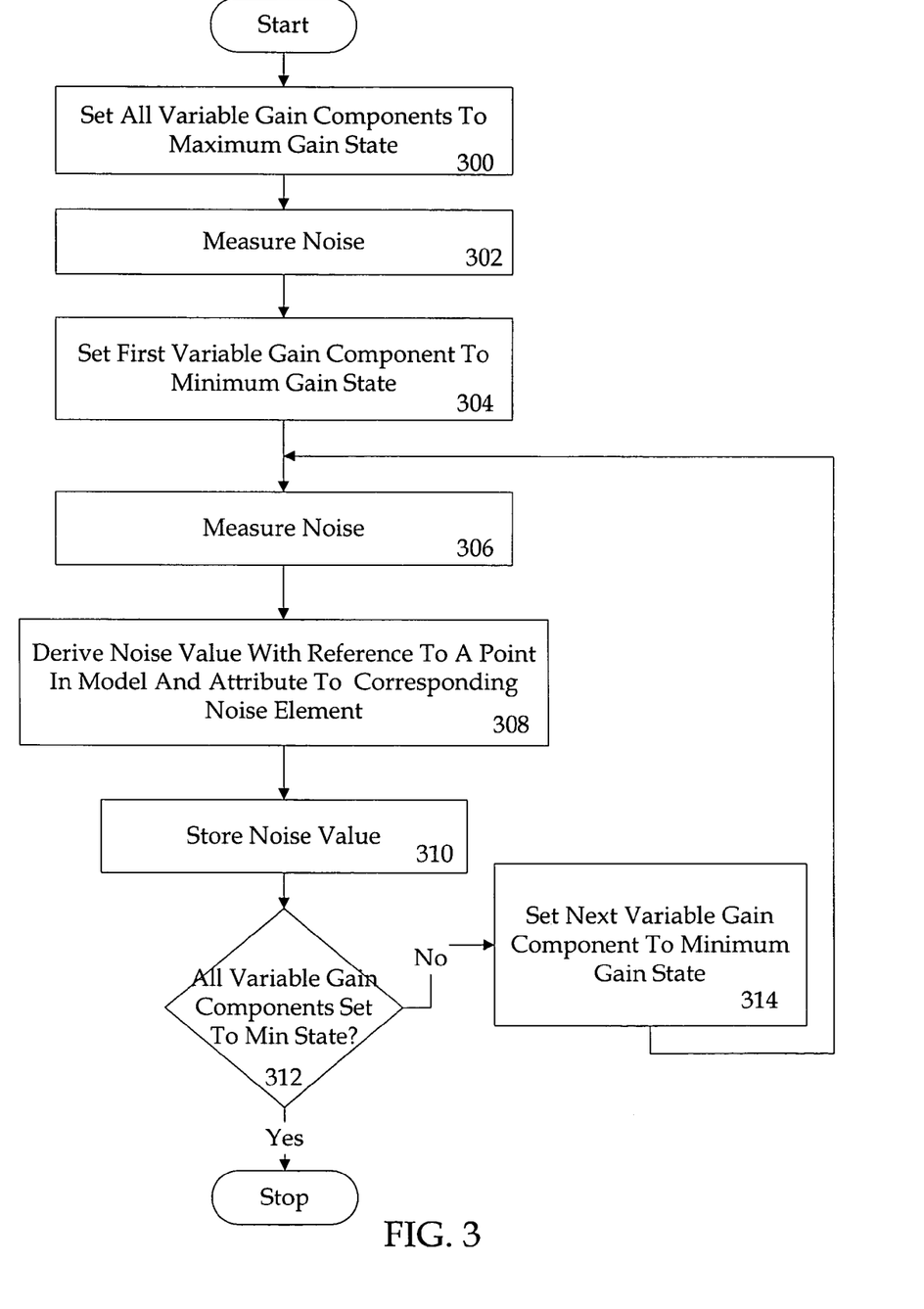
FIG. 3 is a flowchart of a method for determining noise values for each noise element in a noise model in an embodiment in accordance with the invention.

Referring now to FIG. 3, there is shown a flowchart of a method for determining noise values for each noise element in a noise model in an embodiment in accordance with the invention. This method corresponds to block 102 in FIG. 1. The noise values are determined by performing an offline self-calibration test for receiver gain and noise in the FIG. 3 embodiment.

The self-calibration test initially sets all of the variable gain components to a maximum gain state (block 300). In this embodiment in accordance with the invention, the variable gain components include variable attenuators. In other embodiments in accordance with the invention, the variable gain components may be configured as different types of variable gain devices. Examples of different variable gain components include switched amplifiers and switched attenuators.

The noise is then measured at block 302. The variable gain component positioned closest to the receiver input is set to a minimum gain state (block 304) and the noise measured again (block 306). A noise value is derived for the noise element corresponding to the component set at a minimum gain state (block 308). The noise value for that noise element is derived with respect to a desired point within the model. The desired point is selected to optimize the speed of the self-calibration test. One way to achieve speed optimization is by minimizing the amount of time needed to complete all measurements during the self-calibration test. In this embodiment in accordance with the invention, speed optimization is achieved by reducing the number of sweep variables.

The noise value is then stored in a memory, as shown in block 310. Next, a determination is made at block 312 as to whether all of the variable gain components are in a minimum gain state. If so, the process ends. If not, the method passes to block 314 where the next variable gain component is set to a minimum gain state. The method then returns to block 306 and repeats until all of the variable gain components are set to a minimum gain state.

In this embodiment in accordance with the invention, the variable gain components are set to a minimum gain state sequentially, beginning with the variable gain component nearest the receiver input. This is possible because the model of the receiver is a cascaded block diagram. This simplifies the calculation of the noise values. In other embodiments in accordance with the invention, the variable gain components can be set to a minimum gain state in a different order. Furthermore, blocks 308 and 310 may be located after the "yes" path of block 312 in other embodiments in accordance with the invention. The noise values would not be derived and stored until after all of the measurements have been taken. In these embodiments, derivation of the noise values may also involve the solving of a set of simultaneous equations.

Figure 4:
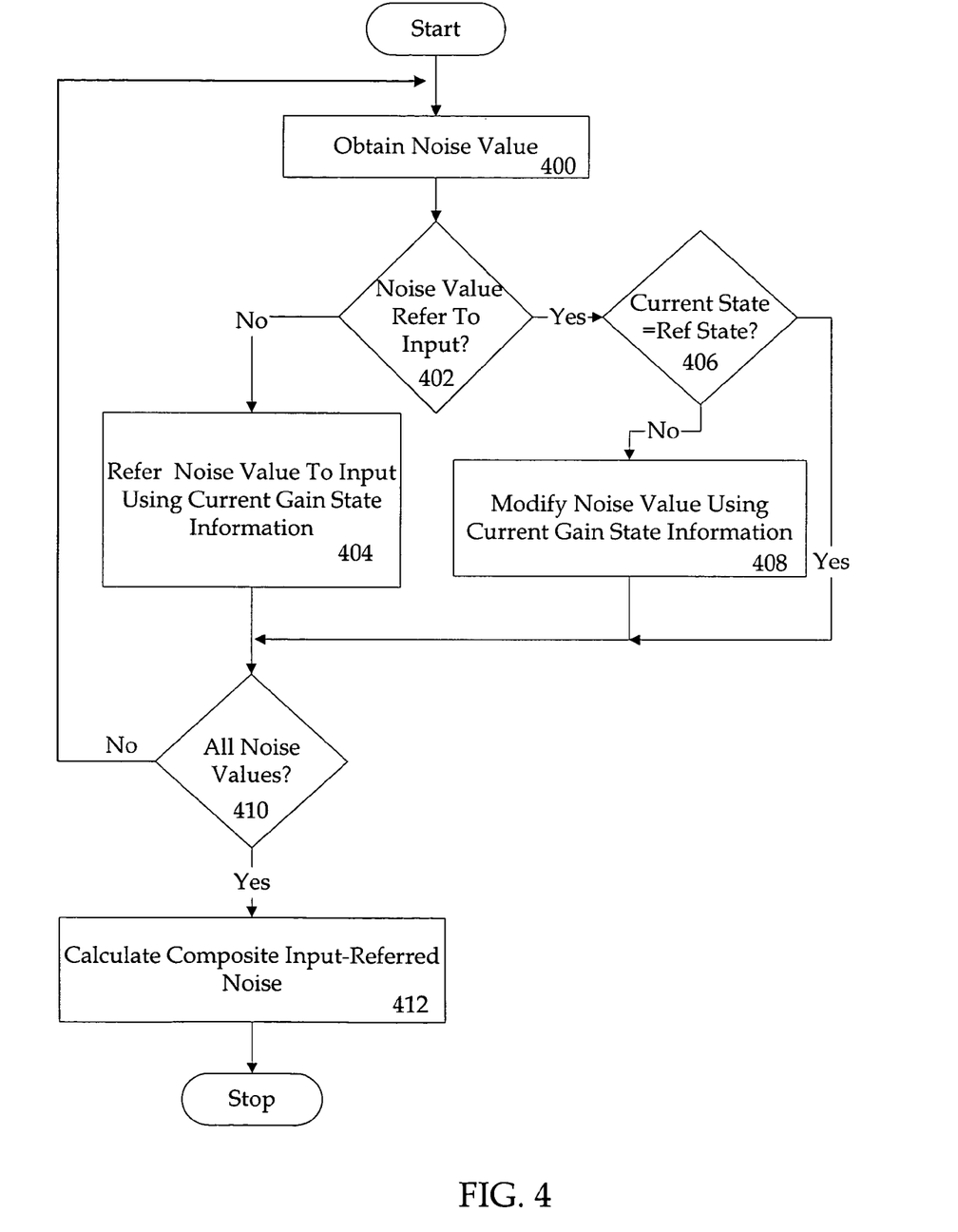
FIG. 4 is a flowchart of a method for calculating a composite input-referred noise in an embodiment in accordance with the invention.

FIG. 4 is a flowchart of a method for calculating a composite input-referred noise in an embodiment in accordance with the invention. This method corresponds to block 104 in FIG. 1. Initially a noise value is read from memory, as shown in block 400. Next, a determination is made at block 402 as to whether the noise value refers to the input of the receiver in the reference state. The reference state is the state at which the reference gain is measured during the gain calibration. The reference state includes the specific settings of the variable gain components, which are determined by a user in this embodiment in accordance with the invention.

If the noise value is not referred to the input, the noise value is re-calculated and referred to the input using the current gain state data for the receiver (block 404). If the noise value is referred to the input in the reference state, a determination is made at block 406 as to whether the current gain state is the same as the reference state. If not, the method continues at block 408 where the noise value is re-calculated using the current gain state information.

A determination is then made at block 410 as to whether all of the noise values are referred to the input with the current gain state information. If not, the process returns to block 400 and repeats until all of the noise values have been reviewed. When all of the noise values are input-referred noise values with the current gain state information, a composite input-referred noise value is calculated (block 412).

Figure 5:
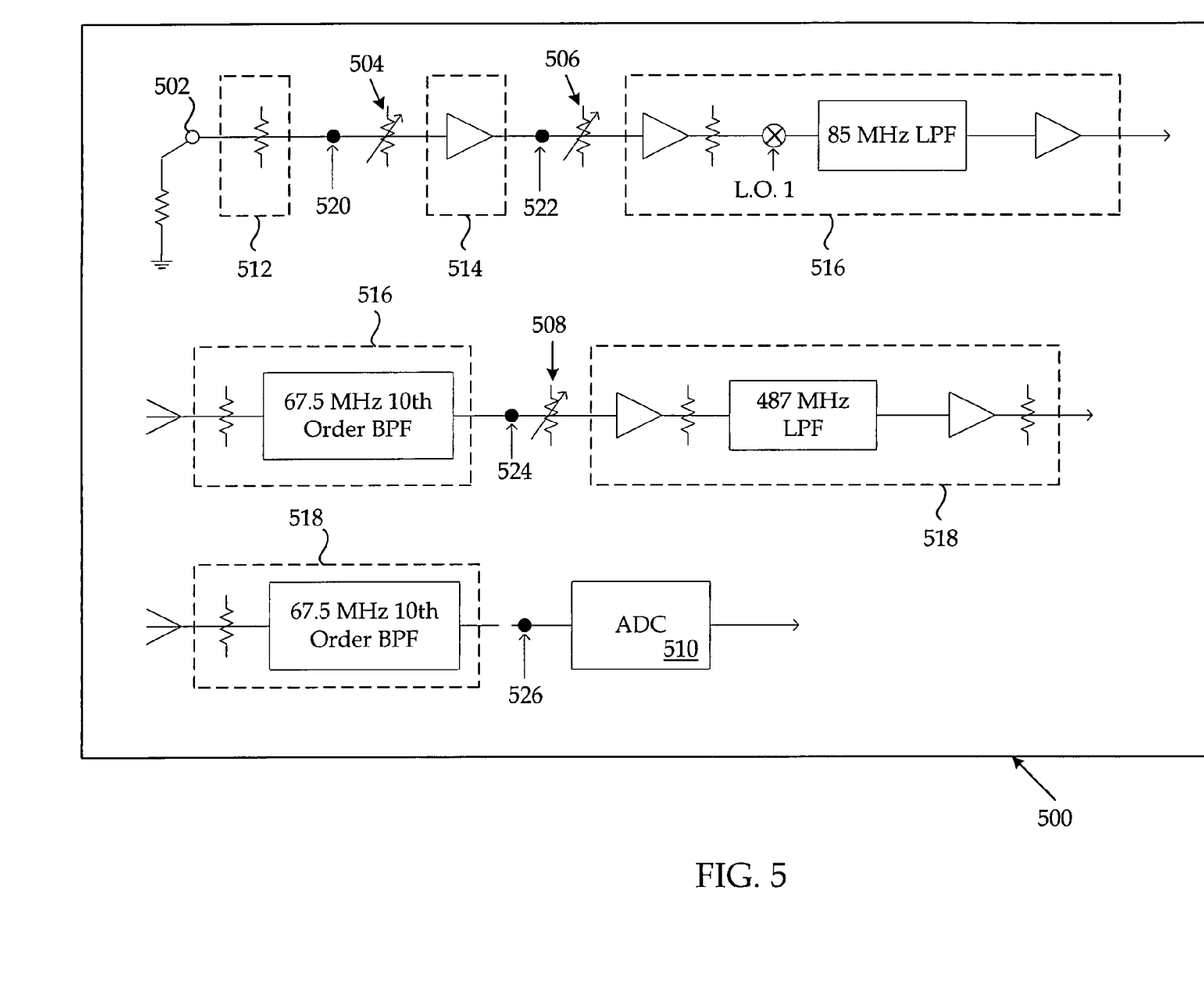
FIG. 5 illustrates a noise model of a mobile station test set receiver in accordance with an embodiment of the invention.

Referring now to FIG. 5, there is shown a noise model of a mobile station test set receiver in accordance with an embodiment of the invention. Noise model 500 includes an input 502, three variable attenuators 504, 506, 508, and an analog-to-digital converter 510. Since there are three variable gain components, a four-element noise model has been generated. The domains of each noise element are defined as all circuitry between its nearest upstream variable attenuator and its nearest downstream variable attenuator (non-inclusive). The domains 512, 514, 516, 518 of the four noise elements 520, 522, 524, 526, respectively, are shown in dashed boxes in FIG. 5. All component noise in each noise domain 512, 514, 516, 518 is referred and attributed to the modeled noise element for that domain, and the magnitude of each noise element 520, 522, 524, 526 is independent of the receiver gain state.

Once the domains of the noise elements are determined, the remaining noise contributors in FIG. 5 are the three variable attenuators 504, 506, 508. The noise contribution from each variable attenuator 504, 506, 508 is difficult to attribute to a noise element since the noise is dependent on the setting of each attenuator. To resolve this difficulty, each variable attenuator "borrows" noise of power density kT from the noise element immediately upstream in this embodiment in accordance with the invention. The value kT is the minimum possible amount of noise. Now the noise contribution from each variable attenuator (as referred to its own output) is independent of attenuator setting. The noise contribution for each variable attenuator is then referred to the nearest downstream noise element in order to provide independence from the receiver gain state.

Those skilled in the art will appreciate that the types of variable gain components in a receiver model will influence the technique used to provide independence from the receiver gain state. In the FIG. 5 model, only one type of variable gain component (i.e., variable attenuator) is used. With variable attenuators, the method of "borrowing" noise from the noise element immediately upstream and referring that noise contribution to the attenuator output provides independence from the receiver gain state. Different types of variable gain components may require different techniques to provide independence from the receiver gain state.

Once the noise contribution is shifted to the nearest downstream noise element, noise element 520 is eliminated from further consideration in the FIG. 5 embodiment. This is because it has a power magnitude of zero and no excess noise in its domain. Consequently, the four-element noise model in FIG. 5 is reduced to a 3-element noise model.

The noise values for the three noise elements 522, 524, 526 are determined by performing an offline self-calibration test for receiver gain and noise. Initially all of the variable attenuators are set to a maximum gain state. The noise in the receiver is measured, and then variable attenuator 504 is set to a minimum gain state. With variable attenuator 504 set to a minimum gain state, the noise in the receiver is measured again. A noise value for noise element 522 is then determined with respect to the input. In the FIG. 5 model, the input-referred value of noise element 522 is independent of IF frequency, so channel power measurements are used to determine the noise value (measured versus RF frequency).

Next variable attenuator 506 is set to a minimum gain state and the noise in the receiver measured. A noise value for noise element 524 is then determined with respect to the input. The input-referred value of noise element 524 is also independent of IF frequency, so channel power measurements are used to determine the noise value (measured versus RF frequency).

And finally, variable attenuator 508 is set to a minimum gain state and the noise in the receiver measured. A noise value for noise element 526 is then determined with respect to the ADC 510. The ADC-referred value of noise element 526 is independent of RF frequency but dependent on IF frequency. Therefore, a Discrete Fourier Transform (DFT) is used to determine the noise value. Since noise element 526 is independent of RF frequency, the DFT does not sweep the RF frequency.

Through algebraic manipulation of the measurements in combination with RF gain calibration data and IF calibration data, the following values are derived:

K1(Frf)=noise element 522 referred to input 502 (in the reference state), versus RF frequency;

K2(Frf)=noise element 524 referred to input 502 (in the reference state), versus RF frequency; and K3(Fif)=noise element 526 referred to ADC 510 (in the reference state), versus IF frequency.

The calculations to derive each K value are:

$$K1(Frf)=(n1(Frf)-n2(Frf))/(Gif(Frf,0)*R(Frf)*(Grf2(0,Frf)-Grf2(31,Frf))$$

$$K2(Frf)=(n2(Frf)-n3(67.5 \text{ MHz})/(R(Frf)*(Gif2(0,Frf)-Gif2(31,Frf))-K1(Frf)*Grf2(31,Frf)$$

$$K3(Fif)=n3(Fif)-R(F3)*H(31,F3,Fif)*Gif6l~(31,F3)*(K2(F3)+K1(F3)*Grf2(31,F3))$$

where

R(Frf)=the power gain from input 502 to ADC 510 in the reference state

Grf1(Nrf1,Frf)=power gain of attenuator 504 relative to a reference state of 0 db Grf2(Nrf2,Frf)=power gain of attenuator 506 relative to a reference state of 19 dB Gif(Nif,Frf)=power gain of attenuator 508 relative to a reference state of 15 dB Hif(Nif,Frf,Fif)=power gain flatness of the IF In the equation for K3, the IF flatness is dependent on both Frf (due to VSWR interactions between the first IF filter and the mixer), and variable attenuator 508 (due to VSWR interactions between the first IF filter and variable attenuator 508. All of the gain quantities above are obtained from a channel power self-calibration and an IF flatness self-calibration in this embodiment in accordance with the invention.

Variable attenuators 504, 506, 508 are 32-step variable attenuators in this embodiment. The gain values (with respect to IF or RF frequency) are set to a maximum gain state when the attenuator is set to a minimum attenuation state (zero in FIG. 5). And the gain values (with respect to If or RF frequency) are set to a minimum gain state when the attenuator is set to a maximum attenuation state (31 in FIG. 5). And, as discussed earlier, all of the K values are defined as power density values.

Once all of the noise values have been calculated in the reference state, a composite input-referred noise value (Nin) is determined with the following equation:

$$Nin=k1(Frf)/Grf1(Nrf1,Frf)+k2(Frf)/Grf1(Nrf1,Frf)/Grf2(Nrf2,Rrf)+k3(Fif)/R/Grf1(Nrf1,Frf)/Grf2(Nrf2,Frf)/Gif(Nif,Frf)/Hif(Nif,Frf,Fif)$$

Since the IF flatness is dependent upon both Frf and attenuator 508 in FIG. 5, referring K3(Fif) to the input requires the use of state-specific IF flatness information.

The gain values in the preceding equations are obtained from the offline gain calibration in this embodiment in accordance with the invention. The gain values may be adjusted when necessary, such as for example, when a temperature change renders the current gain values invalid. Once obtained, the gain values can be used for all receiver gain states as long as the gain values remain valid for the current application and its environmental conditions. Thus, Nin can automatically be re-calculated for any receiver gain state, and the re-calculation is accomplished without user intervention.

Although FIG. 5 has been described with reference to a mobile station test set receiver, embodiments in accordance with the invention are not limited to this implementation. Embodiments in accordance with the invention include receivers making any kind of absolute or relative power measurement with sufficient linearity. Examples of equipment using such receivers include, but are not limited to, equipment having unbiased or "true power" detection, such as spectrum analyzers, vector signal analyzers, and wireless test sets.

Figure 6:
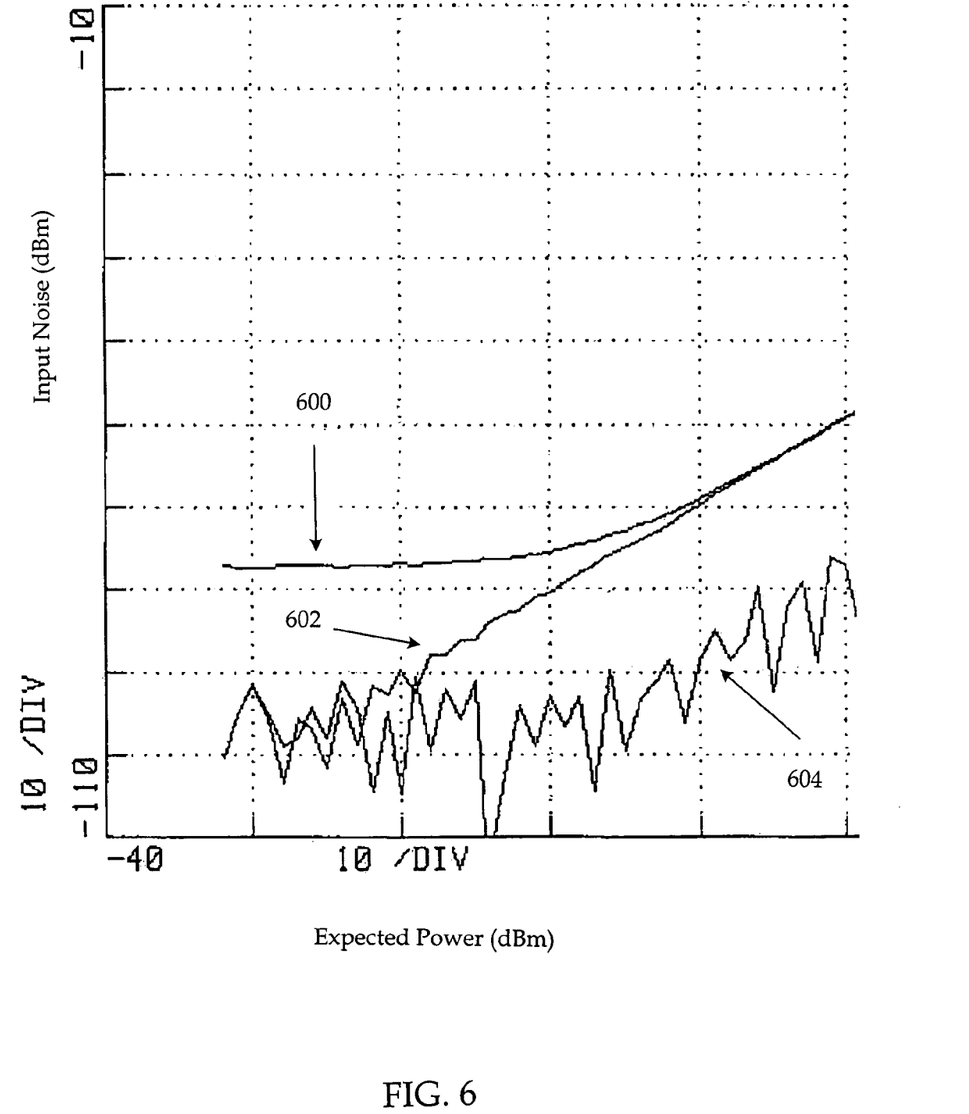
FIG. 6 is a plot of input noise versus expected power in an embodiment in accordance with the invention.

FIG. 6 is a plot of input noise versus expected power in an embodiment in accordance with the invention. The plot illustrates the results of noise subtraction. Plot 600 depicts a signal from a DUT without the subtraction of receiver noise. Plot 602 illustrates a signal from a DUT where the noise is subtracted using the prior art noise subtraction method. As discussed earlier, the prior art method calculates the amount of noise present in a receiver when the receiver is in a particular state (e.g. maximum gain state).

Plot 604 depicts a signal from a DUT where the noise is subtracted using the automatic noise subtraction method illustrated in FIG. 1. As can be seen, the noise in plot 604 is reduced at all points along the plot. As the receiver gain states change for the particular expected power values shown, the level of noise is much less compared to the other two plots 600, 602.

Figure 7:
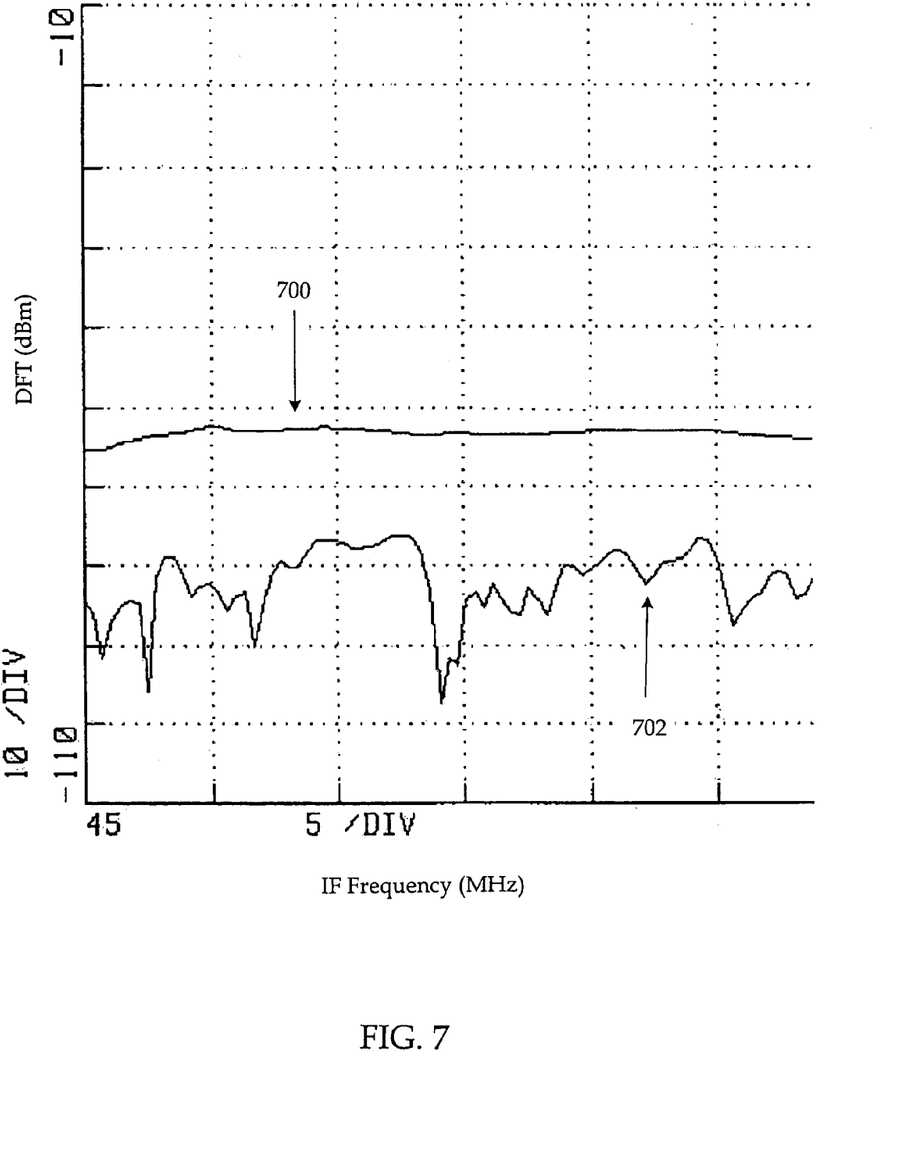
FIG. 7 is a plot of a DFT versus IF frequency in an embodiment in accordance with the invention.

Referring now to FIG. 7, there is shown a plot of a DFT versus IF frequency in an embodiment in accordance with the invention. Plot 700 illustrates a signal without noise subtraction. Plot 702 depicts a signal where noise is subtracted according to the method shown in FIG. 1. As can be seen, the noise in plot 702 is reduced at all points compared to plot 700.

The invention claimed is:

1. A method for automatic subtraction of noise from a signal in a receiver, comprising:
   determining a noise value for each of a plurality of noise elements in a noise model of the receiver, wherein a portion of the components in the noise model are grouped into a domain and each noise element is associated with a domain and the noise contributions for the components within each domain are independent of receiver gain state, and wherein each noise value is determined in a reference state and with reference to a particular point in the noise model;
   calculating a composite input-referred noise value using the noise values and current gain state data for the receiver; and
   subtracting the composite input-referred noise value from the signal in the receiver.

2. The method of claim 1, further comprising generating a noise model of a receiver, wherein the noise model includes the plurality of noise elements.

3. The method of claim 2, wherein the nuber (N) of noise elements in the plurality of noise elements is determined by the equation N=(a number of variable gain components in the receiver −1.

4. The method of claim 2, wherein determining a noise value for each noise element comprises performing an offline self-claiberation test for receiver gain and noise.

5. The method of claim 4, wherein the self-calibration test comprises:
   setting all variable gain components within the receiver to a maximum gain state;
   measuring the noise;
   setting a first variable gain component to a minimum gain state;
   measuring the noise;
   deriving a noise value for a noise element associated with the first variable gain component, wherein the noise value is derived in a reference state and with reference to a point in the receiver model; and
   repeatedly setting another variable gain component to a minimum gain state and deriving a noise value for a noise element associated with the variable gain components are set to a minimum gain state.

6. The method of claim 1, wherein calculating a composite input-referred noise value comprises:
   determining whether each noise value is derived with reference to an input of the receiver;
   if a noise value is not derived with reference to the input of the receiver, re-calculating and referring the noise value to the input of the receiver using the current gain state data for the receiver to generate an input-referred noise value;
   if a noise value is derived with reference to an input of the receiver, re-calculating the noise value using the current gain state data for the receiver to generate an input-referred noise value; and
   adding together all of the input-referred noise values.

7. A method for automatic noise subtraction from a signal in a receiver, comprising:
   dividing a noise model of the receiver into a plurality of noise elements;
   grouping portions of the components in the noise model into domains, wherein each noise element is associated with a domain, and wherein the noise contributions of the components in each domain are independent of receiver gain state;
   determining a noise value for each noise element in the plurality of noise elements, wherein each noise value is determined in a reference state and with reference to a particular point in the noise model;
   calculating a composite input-referred noise value using the noise values and the current gain state data for the receiver; and
   subtracting the composite input-referred noise value from the signal.

8. The method of claim 7, further comprising generating a noise model of the receiver.

9. The method of claim 7, wherein a number (N) of noise elements in the plurality of noise elements is determined by the equation N=(a number of variable gain components in the receiver+1).

10. The method of claim 7, wherein determining a noise value for each noise element comprises performing an offline self-calibration test for receiver gain and noise.

11. The method of claim 10, wherein the offline self-calibration test comprises:
    setting all variable gain components within the receiver to a maximum gain state;
    measuring the noise;
    setting a first variable gain component to a minimum gain state;
    measuring the noise;
    deriving a noise value for a noise element associated with the first variable gain component, wherein the noise value is derived in a reference state and with reference to a point in the receiver model; and
    repeatedly setting another variable gain component to a minimum gain state and deriving a noise value for a noise element associated with the variable gain component set to a minimum gain state until all of the variable gain components are set to a minimum gain state.

12. The method of claim 7, wherein calculating an input-referred noise value for each noise element comprises:
    determining whether each noise value is derived with reference to an input of the receiver;
    if a noise value is not derived with reference to the input of the receiver, re-calculating and referring the noise value to the input of the receiver using the current gain state data for the receiver to generate an input-referred noise value;
    if a noise value is derived with reference to an input of the receiver, re-calculating the noise value using the current gain state data for the receiver to generate an input-referred noise value; and
    adding together all of the input-referred noise values.

13. An apparatus for automatic subtraction of noise from a signal in a receiver, comprising:
    means for determining a noise value for each of a plurality of noise elements in a noise model of the receiver, wherein a portion of the components in the noise model are grouped into a domain and each noise element is associated with a domain and the noise contributions for the components within each domain are independent of receiver gain state, and wherein each noise value is determined in a reference state and with reference to a particular point in the noise model;
    means for calculating a composite input-referred noise value using the noise values and current gain state data for the receiver; and
    means for subtracting the composite input-referred noise value from the signal in the receiver.

14. The apparatus of claim 13, wherein a number (N) of noise elements in the plurality of noise elements is determined by the equation N=(a number of variable gain components in the receiver+1).

15. The apparatus of claim 13, wherein the means for determining a noise value for each noise element comprises:
   means for setting all variable gain components within the receiver to a maximum gain state;
   means for measuring the noise;
   means for setting a first variable gain component to a minimum gain state;
   means for measuring the noise;
   means for deriving a noise value for a noise element associated with the first variable gain component, wherein the noise value is derived in a reference state and with reference to a point in the receiver model; and
   means for repeatedly setting another variable gain component to a minimum gain state and deriving a noise value for a noise element associated with the variable gain component set to a minimum gain state until all of the variable gain components are set to a minimum gain state.

16. The apparatus of claim 13, wherein the means for calculating an input-referred noise value for each noise element comprises:
   means for determining whether each noise value is derived with reference to an input of the receiver;
   if a noise value is not derived with reference to the input of the receiver, means for re-calculating and referring the noise value to the input of the receiver using the current gain state data for the receiver to generate an input-referred noise value;
   if a noise value is derived with reference to an input of the receiver, means for re-calculating the noise value using the current gain state data for the receiver to generate an input-referred noise value; and
   means for adding together all of the input-referred noise values.

* * * * *

UNITED STATES PATENT AND TRADEMARK OFFICE
CERTIFICATE OF CORRECTION

PATENT NO. : 7,266,358 B2 Page 1 of 1
APPLICATION NO. : 10/737440
DATED : September 4, 2007
INVENTOR(S) : Hillstrom It is certified that error appears in the above-identified patent and that said Letters Patent is hereby corrected as shown below:

In column 7, line 21, in Claim 3, delete "nuber" and insert -- number --, therefor.

In column 7, line 24, in Claim 3, delete "-1." and insert -- +1). --, therefor.

In column 7, line 25, in Claim 4, delete "claim 2," and insert -- claim 1, --, therefor.

In column 7, line 27, in Claim 4, delete "claiberation" and insert -- calibration --, therefor.

In column 7, line 43, in Claim 5, after "gain" insert -- component set to a minimum gain state until all of the variable gain --.

Signed and Sealed this

Third Day of June, 2008

JON W. DUDAS
*Director of the United States Patent and Trademark Office*